(12) United States Patent
Miyagi

(10) Patent No.: US 7,130,597 B2
(45) Date of Patent: *Oct. 31, 2006

(54) RECEIVER HAVING HIGH-FREQUENCY AMPLIFIER CIRCUIT PORTIONS INTEGRALLY FORMED ON A SEMICONDUCTOR SUBSTRATE

(75) Inventor: Hiroshi Miyagi, Jouetsu (JP)

(73) Assignee: Niigata Seimitsu Co., Ltd., Jouetsu (JP)

( * ) Notice: Subject to any disclaimer, the term of this patent is extended or adjusted under 35 U.S.C. 154(b) by 203 days.

This patent is subject to a terminal disclaimer.

(21) Appl. No.: 10/482,003

(22) PCT Filed: Jun. 24, 2002

(86) PCT No.: PCT/JP02/06269

§ 371 (c)(1),
(2), (4) Date: Dec. 23, 2003

(87) PCT Pub. No.: WO03/003595

PCT Pub. Date: Jan. 9, 2003

(65) Prior Publication Data

US 2005/0107062 A1    May 19, 2005

(30) Foreign Application Priority Data

Jun. 29, 2001    (JP) .............................. 2001-198213

(51) Int. Cl.
G06F 3/033    (2006.01)
H03J 7/32    (2006.01)
H04B 1/10    (2006.01)

(52) U.S. Cl. ..................... 455/130; 455/147; 455/148; 455/222; 455/296; 455/311

(58) Field of Classification Search ................ 455/130, 455/147–148, 222, 296, 311
See application file for complete search history.

(56) References Cited

U.S. PATENT DOCUMENTS

| 6,930,552 B1* | 8/2005 | Miyagi ........................ 330/277 |
| 2001/0031629 A1* | 10/2001 | Elder et al. .................. 455/324 |
| 2002/0142746 A1* | 10/2002 | Li et al. ...................... 455/307 |

FOREIGN PATENT DOCUMENTS

| JP | 07-245568 | 9/1995 |
| JP | 09-139689 | 5/1997 |
| JP | 2000-82779 | 3/2000 |
| JP | 2000-332629 | 11/2000 |
| JP | 2002-057294 | 2/2002 |

* cited by examiner

Primary Examiner—George Eng
Assistant Examiner—Michael Thier
(74) Attorney, Agent, or Firm—patenttm.us; James H. Walters

(57) ABSTRACT

A receiver capable of reducing a low-frequency noise generated when a component is integrally formed on a semiconductor substrate by using CMOS process or MOS process. A high-frequency amplifier circuit 11, a mixing circuit 12, a local oscillator 13, intermediate-frequency filters 14 and 16, an intermediate-frequency amplifier circuit 15, a limit circuit 17, an FM detection circuit 18, and a stereo demodulation circuit 19 constituting an FM receiver are formed as a one-chip component 10. This one-chip component 10 is formed on a semiconductor substrate by using the CMOS process or the MOS process. The amplification elements contained in the mixing circuit 12, the intermediate-frequency filters 14 and 16, the intermediate-frequency amplifier circuit 15, and the local oscillator 13 are formed by using the p-channel type FET.

5 Claims, 4 Drawing Sheets

RECEIVER HAVING HIGH-FREQUENCY AMPLIFIER CIRCUIT PORTIONS INTEGRALLY FORMED ON A SEMICONDUCTOR SUBSTRATE

TECHNICAL FIELD

The present invention relates to a receiver for providing frequency conversion of a received modulated wave signal.

BACKGROUND ART

A general receiver adopting a super-heterodyne method converts a frequency by using a mixing circuit after amplifying a modulated wave signal received via an antenna at a high frequency, and demodulates it after converting it into an intermediate-frequency signal having a predetermined frequency.

Particularly, in recent years, a research is underway as to a technology for integrally forming an analog circuit including a high-frequency component on a semiconductor substrate by using CMOS process or MOS process, which is put to practical use in certain apparatuses. It is possible, by forming various kinds of circuits on one chip by using the CMOS process or the MOS process, to miniaturize and reduce cost of the entire apparatus. Therefore, it is thinkable that the range of the apparatuses to be formed on one chip will expand from now on.

To form the components of a receiver in the past adopting a super-heterodyne method on one chip by using the CMOS process or the MOS process, there is a problem that low-frequency noise called 1/f noise increases. In general, compared to a bipolar transistor, a MOS-type FET is characterized by having high 1/f noise. And if the components constituting the receiver are formed on one chip by using the CMOS process or the MOS process, an FET as an amplification element included therein becomes a source of the 1/f noise. Moreover, in the case of converting a modulated wave signal of a high frequency into an intermediate-frequency signal of a low frequency by using a mixing circuit, a ratio of the 1/f noise component in the intermediate-frequency signal becomes higher, resulting in deterioration of receiving quality due to decline in an SN ratio.

DISCLOSURE OF THE INVENTION

The present invention was created in view of these points, and an object thereof is to provide a receiver capable of reducing low-frequency noise generated in the case of performing integral formation on a semiconductor substrate by using CMOS process or MOS process.

To solve the above-mentioned problem, a receiver according to the present invention has a high-frequency amplifier circuit, a local oscillator, a mixing circuit, an intermediate-frequency amplifier circuit and an intermediate-frequency filter. The high-frequency amplifier circuit amplifies a modulated wave signal received via an antenna. The local oscillator generates a predetermined local oscillation signal. The mixing circuit mixes and outputs the modulated wave signal amplified by the high-frequency amplifier circuit and the local oscillation signal outputted from the local oscillator. The intermediate-frequency amplifier circuit amplifies an intermediate-frequency signal outputted from the mixing circuit. The intermediate-frequency filter selectively outputs the intermediate-frequency signals. And at least the mixing circuit, intermediate-frequency amplifier circuit, intermediate-frequency filter and local oscillator are integrally formed on the semiconductor substrate by using the CMOS process or the MOS process, and amplification elements included therein are formed by using a p-channel type FET. 1/f noise itself can be reduced by using the p-channel type FETs of which mobility is low as the amplification elements. Therefore, it is possible, in the case where at least the mixing circuit, intermediate-frequency amplifier circuit, intermediate-frequency filter and local oscillator are integrally formed on the semiconductor substrate by using the CMOS process or the MOS process, to reduce the low-frequency noise generated therein.

It is desirable that the above-mentioned intermediate-frequency filter extracts a difference component between the modulated wave signal and the local oscillation signal as the intermediate-frequency signal. In the case of using the difference component, the frequency of the intermediate-frequency signal after frequency conversion is lower than that of the modulated wave signal, and so influence of the 1/f noise of the amplification elements formed by using the CMOS process or the MOS process becomes conspicuous. Therefore, in such cases, the amplification elements to be the source of the noise are formed by the p-channel type FET so as to have a greater effect of noise reduction.

It is also desirable that the above-mentioned difference between the frequency of the local oscillation signal and a carrier frequency of the modulated wave signal is smaller than an occupied frequency bandwidth of the modulated wave signal. In particular, in the case where the frequencies of the modulated wave signal and the local oscillation signal are set as described above, an area close to a DC component is used as a signal band so that the influence of the 1/f noise becomes most significant. Therefore, in such cases, the effect of noise reduction becomes most significant by forming the amplification elements as the source of the noise with the p-channel type FET.

The above-mentioned mixing circuit, intermediate-frequency amplifier circuit and intermediate-frequency filter are cascade-connected. When paying attention to the FETs multi-connected as the amplification elements included therein, it is desirable to set a gate length L and a gate width W of the FETs placed in preceding stages at values larger than the gate length L and gate width W of the FETs placed in subsequent stages thereto. It is generally known that the 1/f noise generated in the FETs becomes higher in proportion to each reciprocal of the gate length L and gate width W. Therefore, it is possible, by setting the gate length L and gate width W at large values, to reduce the 1/f noise generated in the FETs. Especially, considering the FETs multi-connected as the amplification elements, it is desirable to reduce the 1/f noise generated in the FETs included in the preceding stages for the sake of reducing overall low-frequency noise because it is amplified in the FETs placed in subsequent stages thereto. And it is thinkable that, as the 1/f noise generated in the FETs included in the subsequent stages is amplified to a lesser extent in further subsequent stages thereto, it contributes little to reduction in the overall low-frequency noise. Therefore, it is possible, by setting the gate length L and gate width W included in the subsequent stages at values smaller than those of the FETs in preceding stages thereto, to reduce the area required by the FETs so as to reduce the cost by miniaturization of the chips.

As the above-mentioned mixing circuit, intermediate-frequency amplifier circuit and intermediate-frequency filter are cascade-connected, it is desirable, by paying attention to the multi-connected FETs at arbitrary positions as the amplification elements included therein, to set the gate length L and gate width W of each FET so that the noise component generated by the FET becomes smaller than that included in an input signal. It is possible, by rendering the noise component generated by any FET smaller than that included in the input signal of that FET, to reduce the overall low-frequency noise.

It is also desirable that the above-mentioned semiconductor substrate has an N-well formed thereon, and the components including at least the mixing circuit, intermediate-frequency amplifier circuit, intermediate-frequency filter and local oscillator are formed on the N-well. It is possible, by forming these components on the N-well, to prevent a noise current from running via a pn joint surface formed between the N-well and the semiconductor substrate beneath it so as to prevent the noise generated in a circuit on the N-well from sneaking on another component through the semiconductor substrate.

It is also desirable that the above-mentioned semiconductor substrate has a guard ring formed around the components. Thus, it is possible to further effectively prevent the noise generated in a circuit on the N-well from sneaking on another component through the semiconductor substrate.

It is also desirable that the above-mentioned guard ring is formed at a position deeper than the N-well from the semiconductor substrate's surface. It is possible, by forming the guard ring at the deeper position, to eliminate the 1/f noise in a low-frequency area sneaking beyond the guard ring.

BEST MODE FOR CARRYING OUT THE INVENTION

Hereafter, a receiver according to an embodiment of the present invention will be described in detail.

Figure 1:
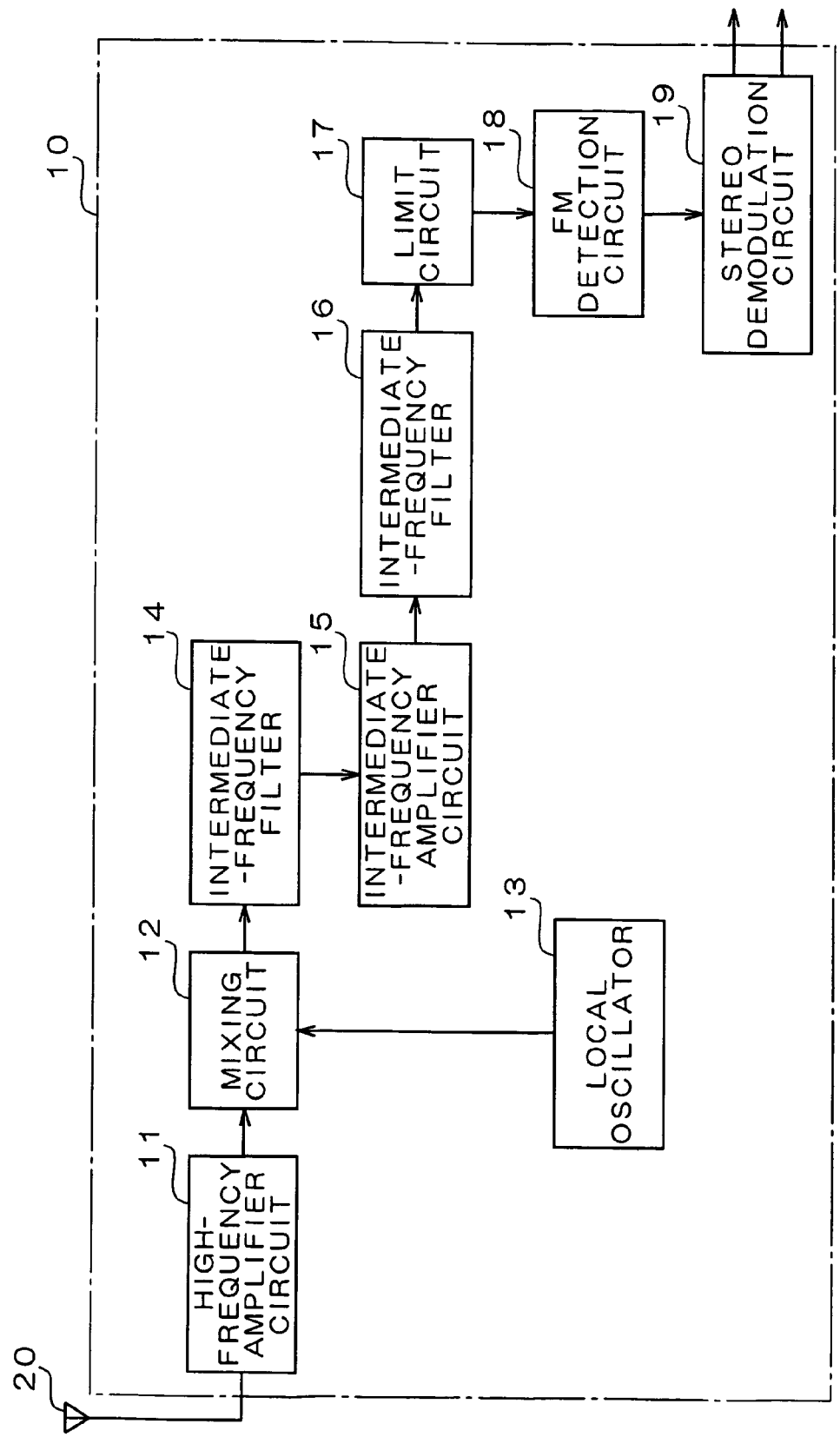
FIG. 1 is a diagram showing a configuration of an FM receiver according to the embodiment.

FIG. 1 is a diagram showing a configuration of an FM receiver according to the embodiment. The FM receiver shown in FIG. 1 is comprised of a high-frequency amplifier circuit 11, a mixing circuit 12, a local oscillator 13, an intermediate-frequency filters 14, 16, an intermediate-frequency amplifier circuit 15, a limit circuit 17, an FM detection circuit 18 and a stereo demodulation circuit 19 which are formed a one-chip component 10.

After amplifying an FM modulated wave signal received by an antenna 20 with the high-frequency amplifier circuit 11, a high-frequency signal is converted into an intermediate-frequency signal by mixing it with a local oscillation signal outputted from the local oscillator 13. For instance, if a carrier frequency of the modulated wave signal outputted from the high-frequency amplifier circuit 11 is f1 and the frequency of the local oscillation signal outputted from the local oscillator 13 is f2, an intermediate-frequency signal having the frequency of f1−f2 is outputted from the mixing circuit 12.

The intermediate-frequency filters 14 and 16 are provided to a preceding stage and a subsequent stage to the intermediate-frequency amplifier circuit 15, and extract only a predetermined band component from an inputted intermediate-frequency signal. The intermediate-frequency amplifier circuit 15 amplifies some intermediate-frequency signals passing through the intermediate-frequency filters 14 and 16.

The limit circuit 17 amplifies the inputted intermediate-frequency signal with a high gain. The FM detection circuit 18 performs FM detection to a signal of fixed amplitude from the limit circuit 17. The stereo demodulation circuit 19 performs stereo demodulation to a composite signal after the FM detection outputted from the FM detection circuit 18 so as to generate an L signal and an R signal.

The above-mentioned one-chip component 10 of this embodiment is integrally formed on the semiconductor substrate by using CMOS process or MOS process. This semiconductor substrate has the circuits constituting the one-chip component 10 shown in FIG. 1 formed thereon, and also has various analog and digital circuits formed thereon. It is easy to form various CMOS components by using the CMOS process or the MOS process. Therefore, it is desirable, for instance, to have a frequency synthesizer for varying an oscillation frequency of the local oscillator 13 to set a receiving frequency, a display and a control circuit thereof formed on the same semiconductor substrate.

Incidentally, the FET formed by using the CMOS process or the MOS process is generally characterized by having significant 1/f noise which is low-frequency noise compared to a bipolar transistor. Therefore, if the one-chip component 10 shown in FIG. 1 is formed on one chip by using the CMOS process or the MOS process, the FET as an amplification element included therein becomes a source of the 1/f noise. Furthermore, in the case of converting a modulated wave signal of a high frequency into an intermediate-frequency signal of a low frequency by using the mixing circuit 12, the ratio of the 1/f noise component in the intermediate-frequency signal becomes higher, resulting in deterioration of receiving quality due to decline in an SN ratio.

For this reason, the one-chip component 10 constituting the receiver according to this embodiment uses p-channel type FETs as the amplification elements included in the mixing circuit 12, an intermediate-frequency filters 14, 16, an intermediate-frequency amplifier circuit 15 and local oscillator 13.

Figure 2:
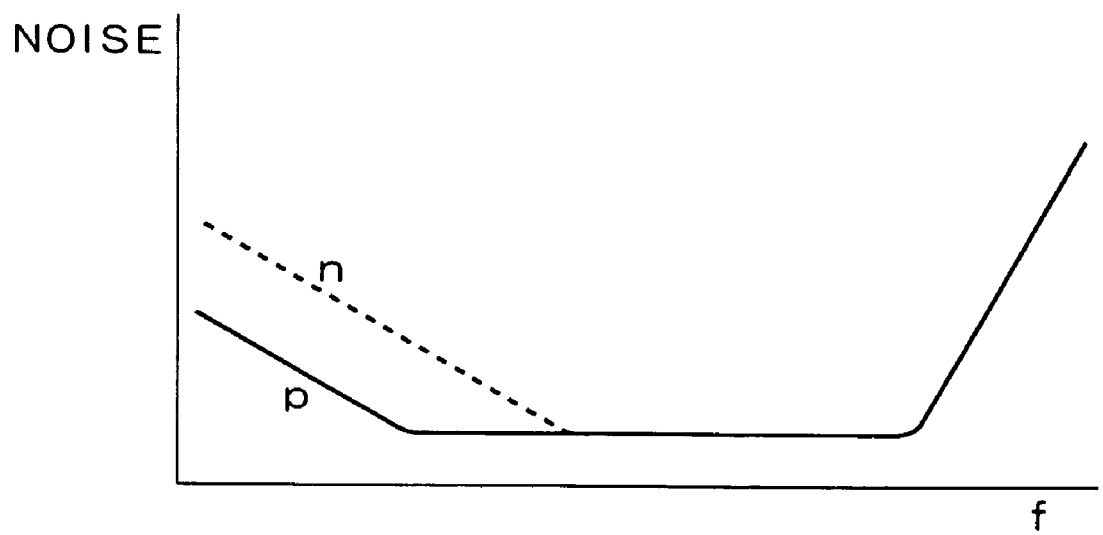
FIG. 2 is a diagram showing a noise characteristic of the FET manufactured by using the CMOS process or the MOS process.

FIG. 2 is a diagram showing a noise characteristic of the FET manufactured by using the CMOS process or the MOS process. The horizontal axis indicates the frequency, and the vertical axis indicates the noise level respectively. The characteristic indicated in full line shows the noise characteristic of the p-channel type FET, and the characteristic indicated in dotted line shows the noise characteristic of the n-channel type FET. As shown in FIG. 2, the p-channel type FET has less 1/f noise appearing in a low-frequency area than the n-channel type FET. It is supposedly because the p-channel type FET has less mobility.

Therefore, the 1/f noise itself can be reduced by using the p-channel type FETs as the amplification elements. Thus, it is possible to reduce generation of the low-frequency noise in the one-chip component 10 so as to improve the SN ratio and signal quality of the entire receiver.

In consideration of the circuits from the mixing circuit 12 to the intermediate-frequency filter 16 in the subsequent stage (or to the limit circuit 17) included in the above-mentioned one-chip component 10, it is thinkable, by paying attention to the amplification elements of which amplification factor is one or more included in these circuits, that a plurality of stages of amplification elements are equivalently multi-connected.

Figure 3:
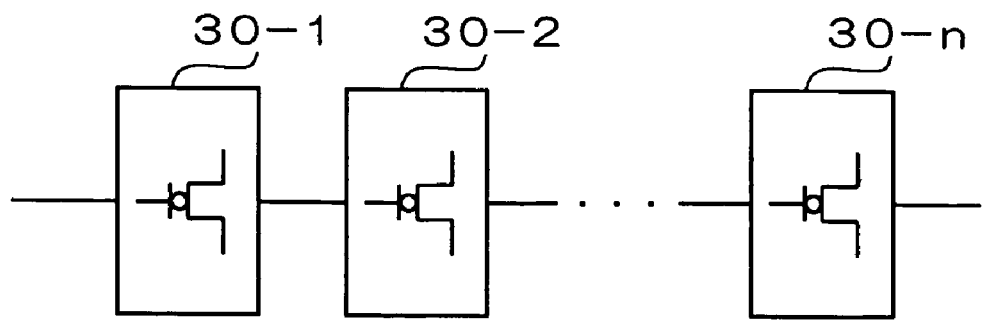
FIG. 3 is a diagram showing an overview of multi-connected amplification elements.

FIG. 3 is a diagram showing an overview of multi-connected amplification elements. As shown in FIG. 3, n stages of amplification elements 30-1, 30-2, . . . , 30-n are multi-connected. As described above, the amplification elements 30-1 and so on are comprised of the p-channel type FETs.

Incidentally, a noise voltage $V_n$ generated by the MOS-type FET can be represented in general as follows.

$$V_n = \sqrt{((8kT(1+\eta)/(3g_m) + KF/(2f\, Cox WLK'))\Delta f}$$

Here, reference symbol k denotes a Boltzmann's constant, T denotes an absolute temperature, $g_m$ denotes mutual conductance, Cox denotes a capacity between a gate and a channel sandwiching a gate oxide film, W denotes the gate width, L denotes the gate length, f denotes the frequency, and $\Delta f$ denotes a bandwidth of the frequency f. KF denotes a noise parameter which is a value between $10^{-20}$ to $10^{-25}$ or so. And $\eta$ and K' are predetermined parameters.

In this formula, it is understandable that the second term on the right side denotes the 1/f noise, which is in proportion to the reciprocal of f, that is, the lower the frequency f becomes, the more significant the 1/f noise becomes.

Figure 4:
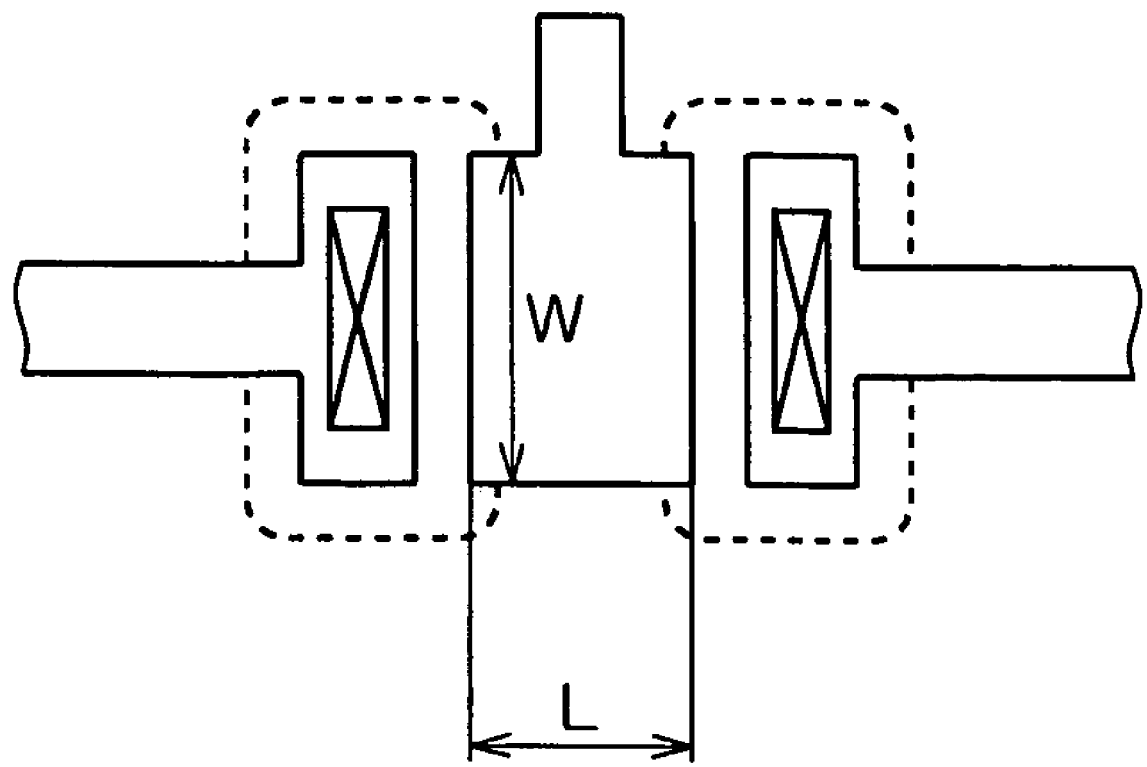
FIG. 4 is a diagram showing the gate width W and the gate length L of the FET.

It is also understandable from this formula that the 1/f noise is also in proportion to the reciprocal of the gate width W and the reciprocal of the gate length L. FIG. 4 is a diagram showing the gate width W and the gate length L of the FET, where a plan view showing the entire FET formed in the proximity of the semiconductor substrate's surface is shown.

Therefore, it is understandable that the 1/f noise can also be reduced by setting the gate width W and the gate length L at large values. If the gate width W and the gate length L are set at large values as to all the FETs, however, the area occupied by each FET becomes larger and leads to increase in chip area. For this reason, it is desirable to set the gate width W and the gate length L at predetermined values only for the FETs to which the reduction in the 1/f noise is very effective.

In particular, considering the case of multi-connecting the amplification elements 30-1 and so on comprised of the FETs, the 1/f noise generated in the amplification element included in the preceding stage is amplified in the amplification element placed in the subsequent stage thereto. Therefore, it is desirable to reduce the 1/f noise generated in the amplification elements included in the preceding stages for the sake of reducing overall low-frequency noise. The 1/f noise generated in the subsequent stages is amplified to a lesser extent in further subsequent stages thereto, and so it supposedly contributes little to reduction in the overall low-frequency noise. Therefore, it is possible, by setting the gate length L and gate width W of the FETs constituting the amplification elements included in the subsequent stages at values smaller than those of the FETs in preceding stages thereto, to reduce the area required by the FETs so as to reduce the cost by miniaturization of the chips.

Otherwise, it is also desirable, by paying attention to the FETs constituting the amplification elements at the arbitrary positions shown in FIG. 3, to set the gate length L and gate width W of the FET constituting each amplification element so that the noise component generated by the FET becomes smaller than that included in the input signal of the FET. It is possible, by rendering the noise component generated by the FET constituting any of the amplification elements smaller than that in the input signal of that FET, to reduce the overall low-frequency noise.

The present invention is not limited to the above embodiment, but various modified embodiments are possible within the gist thereof. For instance, the above embodiment described the FM receiver. However, the present invention is also applicable to various receivers such as an AM receiver and a data terminal device, transmitters or communication devices. The present invention is also applicable, for the sake of performing orthogonal demodulation, to the receiver and so on having two mixing circuits, one local oscillator and one phase shifter.

The above embodiment does not especially refer to a relationship between the frequency of the local oscillation signal and a carrier frequency of the modulated wave signal. In the case where a difference between these frequencies is smaller than the occupied frequency bandwidth of the modulated wave signal, however, an area close to a DC component is used as a signal band in the intermediate-frequency signal outputted from the mixing circuit 12 so that the influence of the 1/f noise becomes most significant. Therefore, it is possible to render the noise reduction most effective by applying the present invention to the receiver having such a setup.

According to the above embodiment, in the case of integrally forming the components including at least the mixing circuit 12, intermediate-frequency amplifier circuit 15, intermediate-frequency filters 14, 16 and local oscillator 13 on the semiconductor substrate, it is possible, by forming these components on the N-well, to prevent the noise from sneaking on another circuit from these components through the semiconductor substrate.

Figure 5:
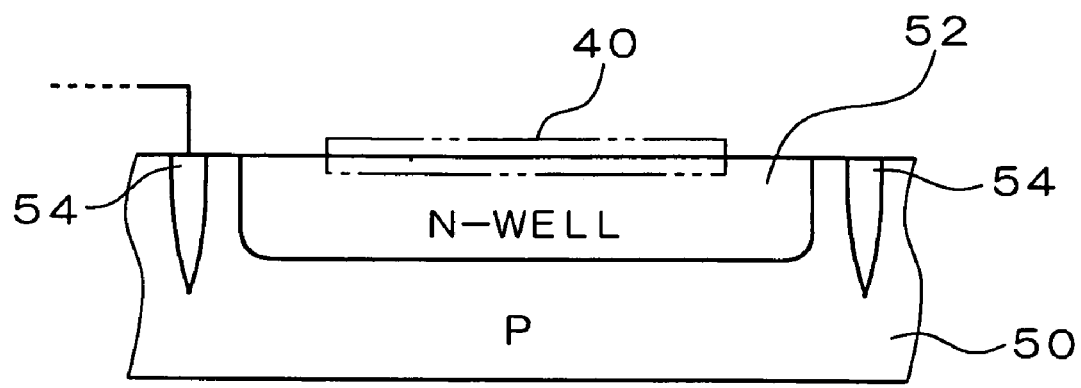
FIG. 5 is a plan view showing an overview configuration in the case of forming the components on the N-well.
Figure 6:
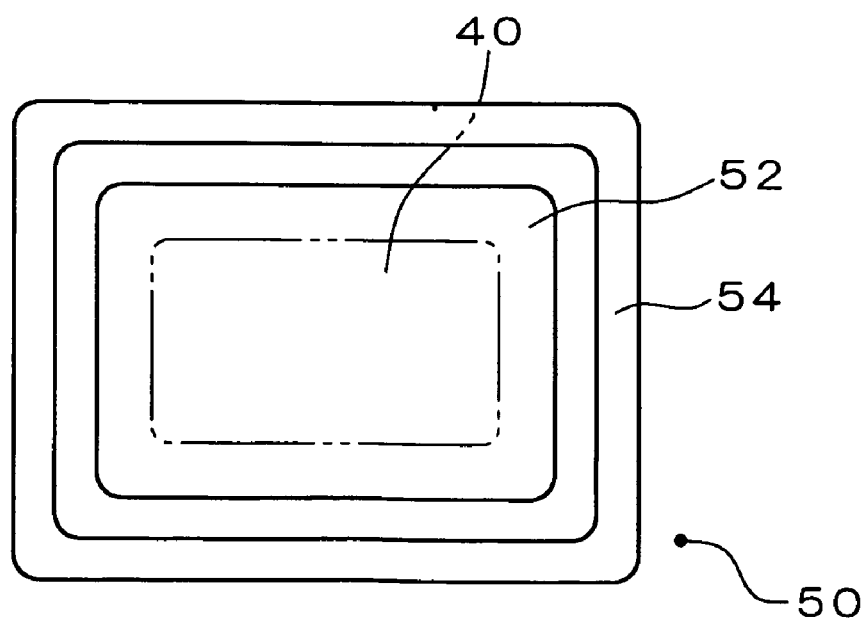
FIG. 6 is a sectional view of the configuration shown in FIG. 5.

FIG. 5 is a plan view showing an overview configuration in the case of forming the components on the N-well. FIG. 6 is a sectional view of the configuration shown in FIG. 5. As for the configuration shown in FIG. 5, it is the case where the multi-connected amplification elements included in a component 40 including at least the mixing circuit 12, intermediate-frequency amplifier circuit 15, intermediate-frequency filters 14, 16 and local oscillator 13 are constituted by using the p-channel type FETs, and the component 40 is formed on an N-well 52.

A PN joint surface is formed between the N-well 52 and a P-type semiconductor substrate 50. Therefore, in the case where an electrical potential of the N-well 52 is higher than that of the semiconductor substrate 50, the current running from the N-well 52 to the semiconductor substrate 50 is interrupted by the PN joint surface. For this reason, it is possible to prevent the noise generated in the component 40 formed on the N-well 52 from sneaking on another circuit through the semiconductor substrate 50.

As shown in FIG. 6, a guard ring 54 is formed in an adjacent area surrounding the N-well 52 close to the surface of the semiconductor substrate 50. The guard ring 54 is a part of the P-type semiconductor substrate 50 formed as an N-type area. As a PNP layer is formed by the guard ring 54 and the semiconductor substrate 50, it is possible to prevent the noise generated in the component 40 formed on the N-well 52 from sneaking on another circuit through a portion close to the surface of the semiconductor substrate 50.

In particular, it is desirable that the guard ring 54 is formed to reach a deeper area of the semiconductor substrate 50, that is, a point deeper than the N-well 52 for instance. Thus, it becomes possible to prevent a lower-frequency component from sneaking in the case where the noise generated in the component 40 formed on the N-well 52 sneaks on another circuit through an underside (inside of the semiconductor substrate 50) of the guard ring 54.

INDUSTRIAL APPLICABILITY

As described above, it is possible, according to the present invention, to reduce the 1/f noise itself by using the p-channel type FETs of which mobility is low as the amplification elements so that, even in the case where at least the mixing circuit, intermediate-frequency amplifier circuit, intermediate-frequency filters and local oscillator are integrally formed on the semiconductor substrate by using the CMOS process or the MOS process, the low-frequency noise generated therein can be reduced.

The invention claimed is:

1. A receiver having a high-frequency amplifier circuit for amplifying a modulated wave signal received via an antenna, a local oscillator for generating a predetermined local oscillation signal, a mixing circuit for mixing and outputting the modulated wave signal amplified by said high-frequency amplifier circuit and the local oscillation signal outputted from said local oscillator, an intermediate-frequency amplifier circuit for amplifying an intermediate-frequency signal outputted from said mixing circuit, and an intermediate-frequency filter for selectively outputting said intermediate-frequency signals, characterized in that at least said mixing circuit, said intermediate-frequency amplifier circuit, said intermediate-frequency filter and said local oscillator are integrally formed on a semiconductor substrate by using CMOS process or MOS process, and amplification elements included therein are formed by using p-channel type FETs, and characterized in that said mixing circuit, said intermediate-frequency amplifier circuit and said intermediate-frequency filter are cascade-connected, and with respect to said FETs multi-connected as said amplification elements included therein, a gate length L and a gate width W of said FETs placed in preceding stages are set at values larger than the gate length L and gate width W of said FETs placed in subsequent stages thereto.

2. A receiver having a high-frequency amplifier circuit for amplifying a modulated wave signal received via an antenna, a local oscillator for generating a predetermined local oscillation signal, a mixing circuit for mixing and outputting the modulated wave signal amplified by said high-frequency amplifier circuit and the local oscillation signal outputted from said local oscillator, an intermediate-frequency amplifier circuit for amplifying an intermediate-frequency signal outputted from said mixing circuit, and an intermediate-frequency filter for selectively outputting said intermediate-frequency signals, characterized in that at least said mixing circuit, said intermediate-frequency amplifier circuit, said intermediate-frequency filter and said local oscillator are integrally formed on a semiconductor substrate by using CMOS process or MOS process, and amplification elements included therein are formed by using p-channel type FETs, and characterized in that said mixing circuit, said intermediate-frequency amplifier circuit and said intermediate-frequency filter are cascade-connected, and with respect to said FETs multi-connected at arbitrary positions as said amplification elements included therein, the gate length L and gate width W of each of said FETs are set so that the noise component generated by the FETs becomes smaller than that included in an input signal.

3. A receiver having a high-frequency amplifier circuit for amplifying a modulated wave signal received via an antenna, a local oscillator for generating a predetermined local oscillation signal, a mixing circuit for mixing and outputting the modulated wave signal amplified by said high-frequency amplifier circuit and the local oscillation signal outputted from said local oscillator, an intermediate-frequency amplifier circuit for amplifying an intermediate-frequency signal outputted from said mixing circuit, and an intermediate-frequency filter for selectively outputting said intermediate-frequency signals, characterized in that at least said mixing circuit, said intermediate-frequency amplifier circuit, said intermediate-frequency filter and said local oscillator are integrally formed on a semiconductor substrate by using CMOS process or MOS process, and amplification elements included therein are formed by using a p-channel type FET, and characterized in that said semiconductor substrate has an N-well formed thereon, and the components including at least said mixing circuit, said intermediate-frequency amplifier circuit, said intermediate-frequency filter and said local oscillator are formed on the N-well.

4. The receiver according to claim 3, characterized in that said semiconductor substrate has a guard ring formed around said components.

5. The receiver according to claim 4, characterized in that said guard ring is formed to a position deeper than said N-well from said semiconductor substrate's surface.

* * * * *